United States Patent [19]

Kuss

[11] Patent Number: 4,865,868
[45] Date of Patent: Sep. 12, 1989

[54] MEAT FLAVORED VEGETABLE OIL PREPARATION METHOD AND PRODUCT

[75] Inventor: George E. Kuss, Memphis, Tenn.

[73] Assignee: Kraft, Inc., Glenview, Ill.

[21] Appl. No.: 120,473

[22] Filed: Nov. 13, 1987

[51] Int. Cl.⁴ .............................................. A23L 1/231
[52] U.S. Cl. ................................. 426/613; 426/386; 426/417; 426/533; 426/601; 426/650
[58] Field of Search ............... 426/613, 601, 533, 650, 426/574, 330.6, 386, 417

[56] References Cited

U.S. PATENT DOCUMENTS

| | | | |
|---|---|---|---|
| 2,559,129 | 2/1946 | Miller | 55/38 |
| 2,714,573 | 8/1955 | Fessler | 426/475 X |
| 2,738,276 | 1/1952 | Blench | 426/312 |
| 3,152,914 | 10/1964 | Taylor | 426/613 |
| 3,348,954 | 10/1967 | Green | 426/613 |
| 3,394,013 | 7/1968 | Dirks et al. | 426/613 X |
| 3,433,649 | 3/1969 | Cooke et al. | 426/613 |
| 3,480,446 | 11/1969 | Hollenbeck | 426/602 |
| 3,535,118 | 12/1974 | Klein et al. | 426/386 |
| 3,783,163 | 1/1974 | Patel | 426/221 |
| 4,169,901 | 10/1979 | Kravis | 426/601 |
| 4,571,342 | 2/1986 | Di Cicca et al. | 426/533 |

Primary Examiner—Donald E. Czaja
Assistant Examiner—Celine T. Callahan
Attorney, Agent, or Firm—Fitch, Even, Tabin & Flannery

[57] ABSTRACT

A method for treating vegetable oil fatty ester shortening composition to provide a natural meaty flavor is provided. In the method, a natural meat fat is heated to a temperature of at least about 150° F. An inert gas is conducted through the natural meat fat while maintaining the natural meat fat at a natural meaty flavor volatilization temperature of at least about 150° F. to provide an inert gas flavorant stream containing natural volatile meaty flavor components. A vegetable oil fatty ester shortening composition is provided at a temperature less than the natural meaty flavor volatilization temperature. The inert gas flavorant stream is conducted through the vegetable oil fatty ester shortening composition while maintaining the vegetable oil fatty ester shortening composition at a temperature less than the volatilization temperature of the meat fat so as to deposit natural meaty flavorant components in the vegetable oil fatty ester shortening composition to provide a vegetable oil fatty ester shortening composition which has a natural meaty flavor.

8 Claims, 2 Drawing Sheets

MEAT FLAVORED VEGETABLE OIL PREPARATION METHOD AND PRODUCT

BACKGROUND OF THE INVENTION

The present invention relates to edible oil compositions which are not primarily of animal origin, having natural meaty flavoring components, and more particularly relates to methods for manufacturing meat flavored fatty ester vegetable oil products which are particularly useful for deep-fat frying, as well as to naturally meat flavored vegetable oil products produced by such methods.

Edible fats and oil products such as beef tallow and vegetable oils, which may be partially hydrogenated, are conventionally used for deep-fat frying of foods in home, institutional, industrial and commercial food preparation, for coating or spraying of precooked food products such as precooked bakery goods, crackers, potato products and other food products in which the organoleptic properties of a suitable shortening are desired.

Deep-fat frying involves the partial or complete submersion of a food product in a bath of edible fat or oil at elevated temperatures to produce rapid cooking.

In deep-fat frying, beef tallow shortening and shortening blends containing beef tallow provide particularly desirable meaty flavor, aroma and other organoleptic properties to food products cooked with such tallow containing products. In deep-fat frying, some of the fat is retained in the fried food product. Because large quantities of food products are passed through the heated fat, the fat must be continuously or periodically replenished to restore to the cooking bath, the fat carried out with the cooked food product. Large quantities of tallow containing fats and oils are consumed in the commercial deep-frying of products such as donuts, french fried-potatoes, potato chips, chicken, nuts and fish. Tallow containing products are also used as a spray or coating on prebaked products such as crackers and potato products. However, beef tallow contains cholesterol, which is incorporated into the fried food product together with the glyceride components of the tallow. Beef tallow also contains a relatively high proportion of saturated fatty acids, which are also incorporated into food products fried therein.

In order to reduce the amount of cholesterol and saturated fatty acids incorporated in fried, baked and prebaked food products, vegetable oil shortenings may be used in the preparation of shortening compositions which have relatively low saturated fatty acid content, and moreover, do not contain cholesterol. However, such vegetable oil shortenings typically do not provide the desirable natural meaty flavor of beef tallow.

Substantial effort has been made to develop vegetable oil products which have desirable meaty flavor characteristics in deep-frying use. For example, U.S. Pat. 4,169,901 describes efforts to provide volatile, artificial meaty flavorants for deep-fat frying shortenings. However, such products contain artificial ingredients, and edible vegetable oil shortenings having natural meaty flavoring agents, and methods for preparing such shortenings, would be desirable. Accordingly, it is an object of the present invention to provide such methods. It is a further object to provide edible vegetable shortenings which have a natural meaty flavor and which are able to impart such flavor to foods which are fried in such shortenings, or which are sprayed or coated on such products. These and other objects of the invention will become more apparent from the following detailed description and the accompanying drawings.

DESCRIPTION OF THE INVENTION

Figure 1:
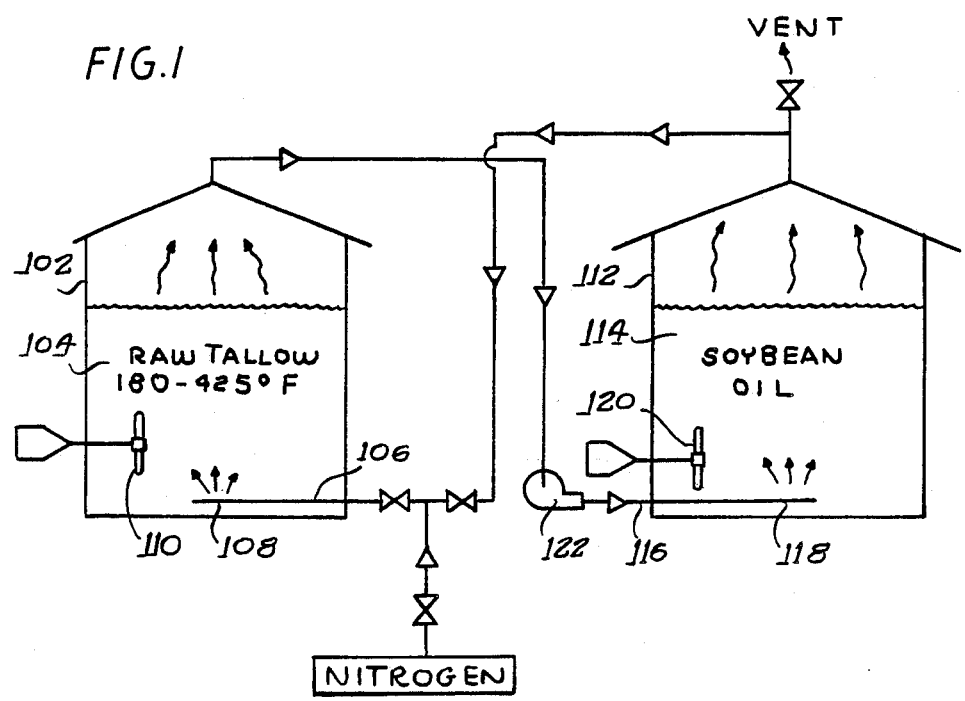
FIG. 1 is an illustration of laboratory scale equipment for preparing natural meaty flavored vegetable oil shortenings suitable for imparting a meaty flavor to foods fried therein, in accordance with an embodiment of the present invention.

Generally in accordance with the present invention, methods are provided for preparing naturally meaty flavored edible shortenings which are able to impart meaty flavors to foodstuffs fried therein, or sprayed or coated therewith.

In accordance with various aspects of such methods, volatile natural meaty flavor components are transferred b means of an inert gas from a flavorant meat fat maintained at an elevated temperature to a flavor recipient edible shortening maintained at a temperature less than that of the flavorant meat fat as will be described in more detail hereinafter.

In accordance with method aspects of the present invention, a meat fat is provided as a source of volatile natural meaty flavor components. The meat fat may preferably be selected from the group consisting of pork tallow (lard), beef tallow, sheep tallow and mixtures thereof. Meat fats may typically be provided in accordance with conventional practice by wet rendering under steam pressure to provide steam tallow. Such tallow need not be refined, but may be dried and clarified, which may include some degree of blanching. Meat fats may also conventionally be produced by dry-rendering processes, which may provide a cooked flavor somewhat different than that of prime steam tallow. The meat fat may be processed to enhance its flavoring properties such as by heating under aqueous conditions as will be further described hereinafter.

Further in accordance with the present methods, the meat fat which is provided as a source of volatile meaty flavor components is heated to an elevated temperature which is preferably at least about 150° F. and preferably is in the range of from about 175° F. to about 220° F. Higher temperatures up to about 450° F. may be used to increase volatilization rate and shorten meaty flavor transfer time. However, such higher temperatures may alter the delicate flavor components or component distribution which may be undesirable in some uses or products. The lower preferred temperature range of 175°–220° F. generally provides the highest quality product in terms of delicacy and quality of flavor. An inert gas is conducted through the meat fat volatile flavor source while maintaining the meat fat at an elevated temperature of at least about 150° F. to provide an inert gas stream containing volatilized natural meaty flavor components from the meat fat. The inert gas may preferably be selected from the group consisting of nitrogen, helium, argon, carbon dioxide and mixtures thereof. It is desirable that the inert gas, such as carbon dioxide, nitrogen, argon, helium or mixtures thereof be substantially oxygen free, and that the oil be deoxygenated prior to being heated to elevated temperature for inert gas stripping. Under selected operating conditions, water vapor (steam) alone or in admixture with other inert gases may also be used as an inert volatile meaty flavor transfer gas. The inert gas should best be intimately dispersed in the meat fat to maximize (consistent with energy of dispersion considerations), the surface area to volume ratio of the gas-meat fat contact area. The meat fat may also be sprayed or misted through a body of the gas in order to achieve a high contact surface area ratio for the conduction of inert gas through the meat fat. The contact time of the gas with the meat fat should best be sufficient to approach equilibrium distribution of desired flavor volatile components between the inert gas and the meat fat. The effective contact time may be increased by small gas bubble size, agitation of the liquid meat fat, the use of an inert solid surface to mediate gas/liquid contact and/or countercurrent contacting techniques. The inert gas may desirably be conducted through the meat fat under atmospheric pressure conditions (e.g., in the range of 14–20 psia), but may also be conducted therethrough under reduced pressure conditions (e.g., 10–14 psia), as will be more fully discussed hereinafter. Higher pressures may be used (e.g., up to 55 psia or more) but are not particularly advantageous.

Further in accordance with the present invention, a vegetable oil fatty ester shortening composition is also provided to receive the meaty flavor components. The methods have particular applicability to vegetable oil fatty ester shortening compositions selected from vegetable oils including oleic-linoleic acid oils, linolenic acid oils and erucic-acid oils, such as cottonseed oil, peanut oil, sesame seed oil, corn oil, soybean oil, safflower oil, sunflower seed oil, rapeseed (canola), and other edible oilseed oils, and mixtures thereof. However, the methods may also be applied to other oils such as polyol fatty acid esters including polyglycerol fatty acid esters and sugar fatty acid esters, and the term vegetable oil fatty ester shortening composition as used herein includes such fatty ester materials.

In accordance with various aspects of the present method, the vegetable oil fatty ester shortening composition is provided at a temperature less than the temperature of the meat fat flavorant source, which will preferably be less than about 120° F., and desirably at a temperature in the range of from about 50° F. to about 90° F. at which the vegetable oil fatty ester shortening composition is a liquid.

The edible vegetable oil fatty ester shortening which is utilized to receive the meaty flavorant components is preferably refined and deodorized. Conventionally, edible vegetable oils such as soybean oil which have a characteristically offensive beany flavor, are refined by alkali treatment, bleached and subjected to a deodorization treatment such as by means of steam injection into a hot oil mass under substantial vacuum. Such deodorization treatment produces a relatively bland vegetable oil which is a suitable recipient for the natural meaty flavor components volatilized into the inert gas stream as previously described.

Such natural flavor components are volatile extractives derived from meat fat which provide significant functional flavoring to the vegetable oil fatty ester shortening at a small concentration. The amount of natural meaty flavor compounds removed from the meat fat flavorant compositions and transferred to the vegetable oil fatty ester composition is typically very small, but the flavor volatile compounds have a significant impact on the organoleptic properties of the vegetable oil fatty ester shortening compositions to which they are transferred.

The edible vegetable oil preferably comprises at least 95% by weight of triglycerides having acyl groups (fatty acid moieties) predominantly in the range of from 16 to 22 carbon atoms. Such vegetable fats may additionally contain minor amounts (e.g., up to 5% by weight) of mono- and diglycerides, free fatty acids, fat-soluble vitamins and other components. The vegetable oil fatty ester may contain glyceride hardstock materials and glyceride base fat materials wherein the fatty acid moiety is unsaturated or has multiple degrees of unsaturation. However, the degree of unsaturation of the base fat should preferably be controlled such as by fractionation, transesterification, hydrogenation or combinations thereof, for example, such that the Iodine Value (or "I.V.") is at least about 50 and preferably in the range of from about 50 to about 120, typically and most preferably from about 90 to about 110. Preferred vegetable oil fatty esters are sufficiently plastic at room temperatures for pumping or ladling, while being resistant to rapid rancidification by oxidative degradation of the unsaturated double bonds.

In accordance with conventional practice, the vegetable oil fatty ester shortening composition may be a blend of hard and soft fats or may be transesterified by inorganic, organic or enzymatic transesterification catalysts to provide a desired composition and consistency. The rheological properties can also be adjusted by the addition of a plasticizer, similarly in accordance with conventional practice.

Preferably, the vegetable oil fatty ester compositions will be fluid at ambient temperatures (e.g., 60°–80° F.). Preferred polyunsaturated triglycerides which are fluid at ambient temperature include soybean oil, cottonseed oil, peanut oil, safflower oil, canola oil and sunflower seed oil.

The vegetable oil fatty ester shortening compositions may further include a variety of optional additive materials such as those commonly employed in deep-frying edible fats and oils such as colorants, antioxidants, artificial flavoring agents, and antifoaming agents in accordance with conventional practice. Such additive materials may be present in the vegetable oil fatty ester shortening composition prior to contact with the meat flavorant gas, or they may be added during or after processing in accordance with the present method. The weight/weight ratio of meat fat utilized in the method to vegetable oil fatty ester shortening composition to be treated should desirably be in the range of from about 4:1 to about 1:4.

Also in accordance with the present method, the inert gas which has been conducted through the meat fat at elevated temperature is subsequently conducted through the vegetable oil fatty ester shortening composition at a temperature of less than the temperature of the meat fat, and preferably in the range of from about 50° to about 120° F. at which the vegetable oil component is a liquid. The inert gas and volatilized meat flavorant components contained therein are best intimately dispersed with the vegetable oil composition as previously described in respect to the conduction of the gas through the meat fat. At least a portion of the natural meat flavorants are deposited in the vegetable oil composition in this manner. The inert gas which has been conducted through the vegetable oil may be vented to the atmosphere, or may be recirculated to the meat fat. The inert gas flavor transfer treatment will be carried out until a desired flavor level is reached which may take at least 2 hours in batch methods.

Vegetable oil fatty ester compositions prepared in accordance with such methods may provide shortening compositions which have a natural meaty flavor, and which impart such natural meaty flavor to food products in which such shortening compositions are incorporated. Such naturally meaty flavored vegetable oil fatty ester compositions have particular utility in deep-fat frying of food products having a natural meaty flavor after frying in such compositions at elevated temperature. Such naturally meaty flavored vegetable oil fatty ester shortening compositions also have particular utility in the preparation of prebaked food products, such as crackers, bakery goods and potato products in which the products are sprayed or coated with such natural meaty flavor vegetable oil shortening compositions after baking of the products, and which are not further cooked or baked. Such sprayed or coated prebaked products may be provided which have a delicate natural meaty flavor without incorporation of cholesterol or significant fully saturated fatty ester food components into the food product.

Having generally described the invention, various additional aspects of the invention will be further described with respect to specific embodiments and processing apparatus. In this regard, batch processing apparatus such as that illustrated in FIG. 1 may be used to prepare meaty flavored vegetable oil fatty ester shortening compositions. Raw tallow or lard may be loaded into tank 102 and heated to approximately 180°–450° F. Deodorized vegetable oil 114 to be treated, such as partially hydrogenated soybean oil having an Iodine Value of about 95 is loaded into tank 112 and the temperature adjusted to 100°–120° F. The tank 112 may similarly be provided with a gas inlet pipe 116 having a gas sparking head 118 and impeller 120.

Nitrogen will be bubbled through the lard in tank 102 and passed through the vegetable oil in tank 112. The gas stream will carry some of the lard flavor components from the relatively hot lard in tank 102 into the relatively cool vegetable oil in tank 112.

To conserve nitrogen, once the system has been purged of air, the external source of nitrogen may be shut off, and the nitrogen atmosphere within the system may be circulated by means of a gas pump (or compressor) 122.

Circulation of the inert gas will continue and the vegetable oil flavor may be evaluated periodically (every few hours) until a satisfactory "tallow" or "lard" flavor is observed. The "lard" or "tallow" flavored vegetable oil is then ready for use. The lard from tank 102 may subsequently be processed in the same fashion as raw lard (refined, bleached and deodorized).

Figure 3:
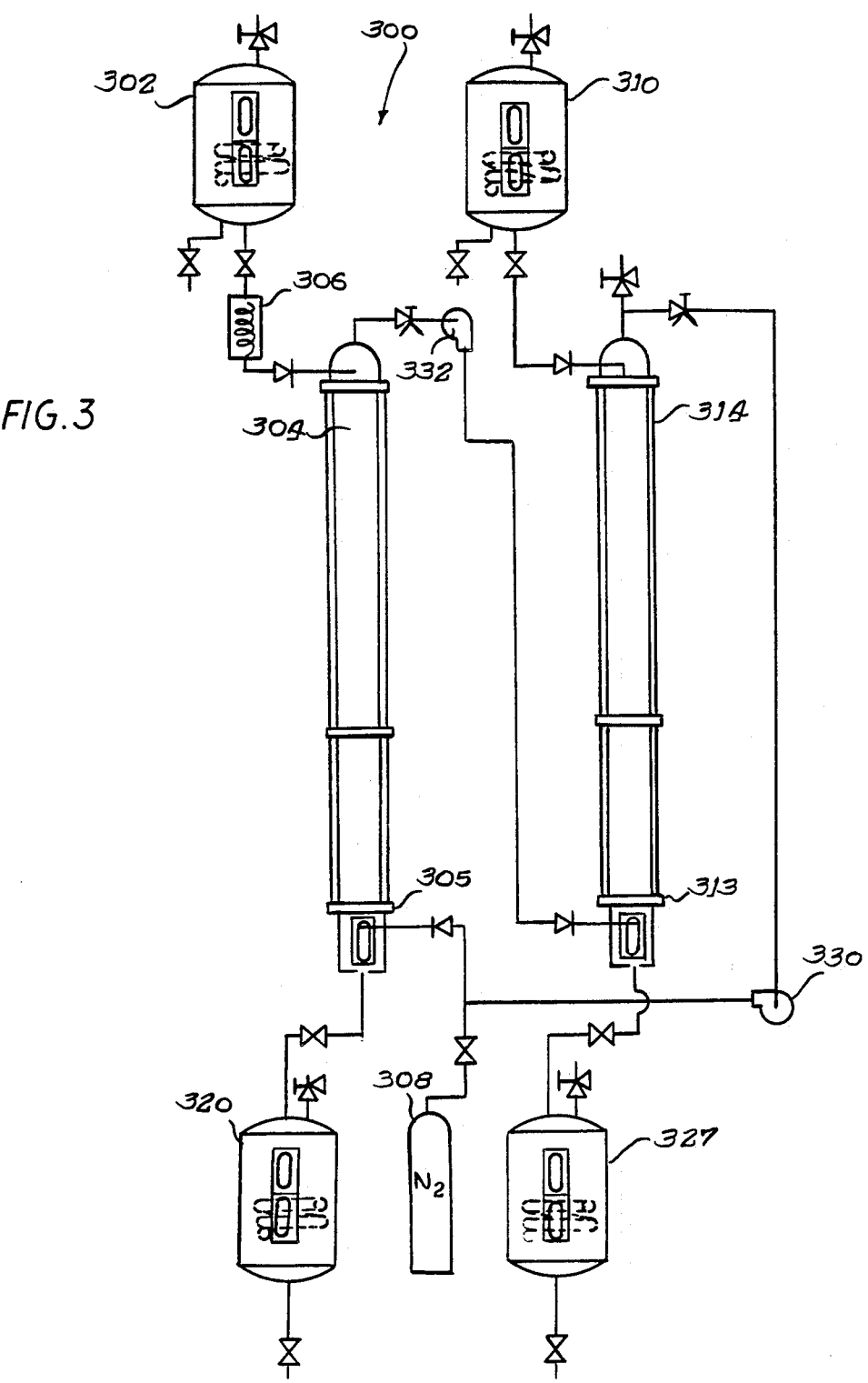
FIG. 3 is an illustration of plant scale continuous countercurrent processing apparatus which may be utilized in carrying out continuous processing embodiments of a method in accordance with the present invention.

While the system of FIG. 1 is a batch processing system, shown in FIG. 3 is a continuous flow counter-current system which may be utilized to continuously manufacture natural meaty flavor shortening products in accordance with particular aspects of the present invention. As shown in FIG. 3, a reservoir of beef tallow 302 is provided, which may be a storage tank maintained under nitrogen at a temperature permitting pumping the tallow.

Further in accordance with the illustrated continuous, countercurrent meat flavorant transfer system 300, the tallow which is desirably continuously excluded from contact with oxygen, is passed into a gas contacting tower 304. The oil may be preheated by passage through a heat exchanger 306 which is similarly provided with heat input from the heating unit (not shown) to an inert gas contacting temperature in the range of from about 150° F. to about 450° F.

The gas contacting tower 304 into which the tallow is introduced, may be a column having a length to diameter ratio (internal volume) of at least about 3, and preferably at least about 20. The illustrated column 302 has a length to diameter ratio of about 40, and is provided with a column packing having a surface area of at least about 30 square feet per cubic foot of treatment zone volume, and preferably at least about 500 square feet per cubic foot. A particularly preferred packing in the form of a coiled metallic screen has a surface area to volume ratio of about 585 square feet per cubic foot.

The column 302 is provided with a thermal jacket into which may be introduced hot oil from the heating unit to maintain the tallow therein at a predetermined natural meaty flavorant transfer temperature of about 180° F.

In order to effect natural meaty flavorant transfer in accordance with the illustrated embodiment of the present invention, nitrogen gas from a source 308, which is substantially pure, having less than about 1 part per million of oxygen, by weight, is introduced into the bottom of the tallow flavorant transfer column 304 by means of a sparking head comprising a fine wire mesh-covered orifice adapted to disperse the nitrogen in fine bubbles into the tallow. The nitrogen is introduced into the tallow at the discharge end 305 of the tower 304 at a pressure in the range of from about 1 to about 10 pounds per square inch above the gauge pressure (representing the liquid head at the point of introduction), to provide a corresponding nitrogen flow rate in the range of from about 14 to about 330 standard cubic feet per hour. The column packing, which may be in the form of stainless steel mesh wire, rings or other suitable inert materials such as porcelain provides a substantially increased surface area for interaction of the nitrogen flavorant transfer gas with the heated tallow 302 in the flavorant transfer column 304. The illustrated column 304 is a continuous process treatment column having an internal volume of about 0.5 cubic feet, a diameter of 3 inches and a height of 10 feet. The tallow 302 may be pumped into the column at the top thereof at a rate in the range of from about 2 to about 24 or more pounds per hour and is concomitantly withdrawn at the bottom of the column into recovery tank 30 at a substantially equivalent rate. In order to prevent channeling of tallow along the sides of the column, wall wipers (rings) adapted to direct flow from the walls adjacent the column into the interior of the column may be provided periodically along the column. However, such wall wipers are unnecessary for use with the preferred coil screen packing which evenly disperses the oil and gas and substantially prevents channeling within the column. In this manner, a substantially uniform flow front is provided in the column 304 for countercurrent sparging of the tallow 302 introduced therethrough. The vegetable oil 312 to be flavored is similarly introduced from a source reservoir 310 into a countercurrent, gas contacting column tower 314 which is substantially identical to tower 304. The vegetable oil, which is refined, bleached and deodorized soybean oil in the illustrated embodiment, is introduced into and conducted through the column at a rate of from about 2 to about 24 pounds per hour, in a weight ratio to the meat fat selected to be in the range of 4:1 to 1:4. The oil 312 is maintained at a temperature of from about 80° F. to about 120° F. in the column 314. Nitrogen which has been conducted through the tallow in column 304, which is laden with natural meaty flavorants, is introduced into the discharge end 313 of the column 314 to transfer the flavor components to the soybean oil in a countercurrent manner.

As indicated, the nitrogen may be introduced into the column 304 at slightly super-atmospheric pressure, and is introduced at a rate which is effective to achieve natural flavorant transfer to the vegetable oil in less than about two hours and preferably less than about 30 minutes of treatment time through the column. In this regard, nitrogen may be introduced at a flow rate which provides an oil to gas weight to weight ratio in the range of from about 1.2 to about 4.5. The nitrogen gas emerges from the top of the column 304, which is provided with suitable screens and baffles to minimize entrainment of tallow in the nitrogen, is conducted from the gas contacting tower 304. The nitrogen bearing the natural meat flavorant components is passed from the tallow gas transfer tower to the countercurrent vegetable oil gas contact tower 314.

The tallow 302 is subjected to an average residence time within the column 304 of at least about 5 minutes, and such as in the range of from about 10 to about 30 minutes. The residence time to achieve economical and effective transfer of the natural meat flavorants will generally decrease with decreasing oil to gas treatment weight ratio under the indicated treatment conditions. The inert gas may be conducted through the tallow at subatmospheric pressure, and conducted through the vegetable oil at higher pressure than that at which it is conducted through the meat fat, such as superatmospheric pressure under control of compressor-pumps 330, 332. In this manner, more effective volatilization from the meat fat (at lower temperatures) and more effective transfer to the vegetable oil may be accomplished. The tallow is subsequently conducted to the tallow receiving tank 320. The vegetable oil having the natural meaty flavorants introduced therein is cooled to ambient temperature and conducted to a storage tank 322 in which is maintained in an oxygen free environment such as provided by a nitrogen blanket.

The gas contact towers 304, 314 may be 10 foot tall, 3 inch diameter jacketed columns which are filled with wound screen distillation packing material, such as sold by Glitsch Inc. under the designation Goodloe. The oil may be allowed to pass through the columns by pumps or gravity, while the countercurrent nitrogen flows are passed through the columns from the bottom and exit through the respective tops, at oil flow rates of, for example, 4.0 liters per hour and nitrogen gas flow rates of 14 cubic feet per hour. The meat fat and flavored vegetable oils emerging from the bottom of the respective columns are collected and cooled in separate receiving tanks.

In using such batch or continuous processes, an enriched tallow flavor can be imparted to a vegetable oil, the finished product possessing relatively stable storage characteristics. In addition, a tallow flavored vegetable oil can be produced that will exhibit similar but temporary flavor characteristics in frying application in comparison to a tallow frying fat.

The meaty (e.g., beefy) flavor and odor imparted to the vegetable oil fatty ester shortening composition may persist for multiple frying sessions, but progressively diminishes in intensity with each frying session. The oil may subsequently revert to a vegetable or even undesirable beany flavor typical of vegetable oil without the natural meaty flavoring. The development of a vegetable or beany aftertaste of the treated oil may be allayed if the oil is first heat treated at an elevated temperature (e.g., 180° F.) for a suitable period of time (e.g., seven days) prior to "flavorization". Such treatment will provide a pleasant buttery flavor after the tallow characteristics have dissipated through frying use.

Figure 2:
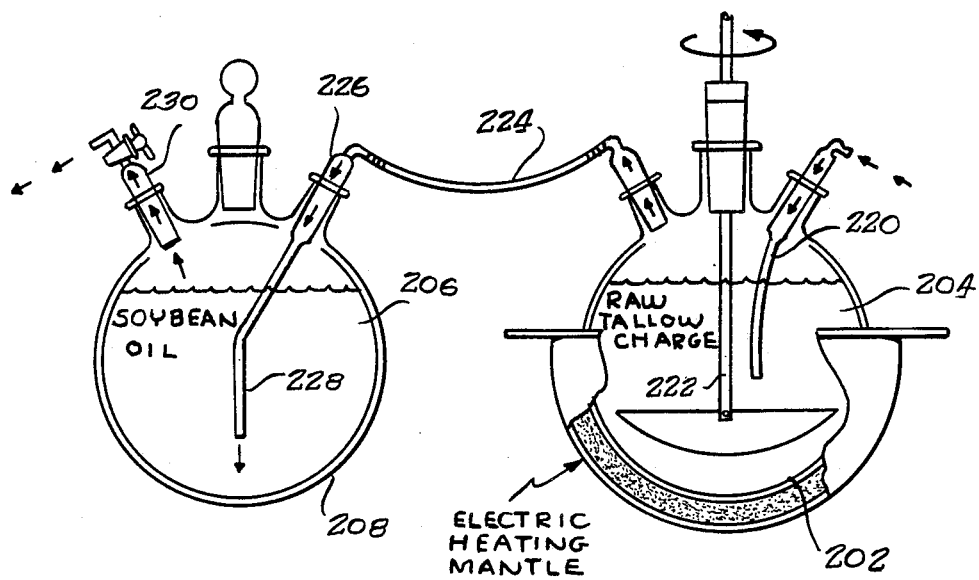
FIG. 2 is a schematic illustration of plant scale process equipment which may be utilized in carrying out batch processing embodiments of a method in accordance with the present invention.

Various aspects of the present invention will now be more particularly described with respect to specific preparations made using apparatus of the type illustrated in FIG. 2.

EXAMPLE 1

Measured portions of refined, bleached, deodorized and partially hydrogenated soybean oil having an Iodine Value of about 95, and raw tallow were loaded into the respective laboratory vessels 202, 208 as shown in FIG. 2. Nitrogen gas was continuously forced into the vessel containing raw tallow. High speed constant agitation was maintained within the vessel 202 to assist in dispersing the nitrogen gas throughout the tallow. The gas in tallow vessel 202 was vented via internal pressure into the vessel 208 containing the soybean oil and allowed to bubble through the oil. The resulting samples were evaluated for flavor and odor stability in storage and frying performance as compared to a tallow frying oil.

In this regard, into vessel 202, 1150 grams of raw tallow 204 were placed. Similarly, 1150 grams of the refined, bleached and deodorized soybean oil 206 were loaded into the vessel 208. A continuous and steady flow of pure nitrogen gas (at approximately 5 psig) was introduced into the system via a glass inlet tube 220. This gas was bubbled through the raw tallow 204 in vessel 202 which was heated to and maintained at 180° F. by means of a heating mantle, as shown in FIG. 1. Additional gas dispersion within the tallow was accomplished by high speed continuous paddle agitation provided by rotary stirring system 222. The gas escaping from the raw tallow was then directed away from the vessel 202 and into vessel 208 via the illustrated glass tubing 224. Upon entering vessel 208, the "tallow flavored" nitrogen was bubbled through the soybean oil contained therein by means of tube 228 projecting below the surface of the oil 206 and was maintained at room temperature (approximately 75° F.) via fitting 230.

This treatment process was maintained under the aforementioned conditions for 40 minutes after which the hydrogenated soybean oil was tested for odor and flavor. Odor was tallowy or "beefy" to a moderate degree as was also the flavor of the oil. The treated sample was placed in a covered container and stored for five days and again evaluated indicating a flavor and odor of reduced intensity. Frying tests indicated a tallow flavor in french fried potatoes only in the first frying session. Subsequent fryings with this particular sample exhibited a vegetable oil flavor.

Another portion of the partially hydrogenated soybean oil was treated as described hereinabove employing similar temperature and gas flow conditions. However, 3.5% of distilled water, as calculated based on the total raw tallow weight, was added to vessel 202 to determined if a more enriched flavor would be produced through the action of water vapor. The charge in vessel 202 was heated to 220° F. with high speed agitation whereupon the added water boiled away being condensed and captured in vessel 208 in which the charge was maintained at 75° F. This process was continued for 40 minutes. The treated soybean oil was then laboratory dried at 220° F. with $N_2$ purge and lowered to 100° F. while continuing the gas purge. The oil was then tested for flavor and odor and found to possess a rich beefy taste and smell. Comparison fry tests of the sample oil and a conventional deep fry tallow shortening indicated similar initial performance, with extended performance to multiple frying sessions. Loss of tallowy characteristics was apparent in the treated oil upon the fourth fry test, with reversion to the normal partially hydrogenated soybean oil flavor.

2000 grams of the partially hydrogenated soybean, oil contained in an open top stainless steel breaker were placed into a laboratory oven and maintained at 180° F. for a period of seven days. This was done to develop a lasting buttery flavor. 1150 grams of this heat-treated soybean oil was placed into vessel 208 and maintained at approximately 75° F. Fresh raw tallow was loaded into vessel 208 into which a nitrogen purge was begun as before, but without the addition of water to assist in the transfer of volatiles. The raw tallow was subjected to constant high speed agitation and raised to a temperature of 400° F. The total natural meaty flavor transfer time at these conditions was three hours. The treated soybean oil was evaluated and found to possess a strong beefy flavor and odor. Frying evaluation of this treated sample (using french fried potatoes) in comparison to a beef tallow shortening indicated once again a strong and rich beefy taste in fries but after the sixth fry this tallowy taste was no longer present in the cooked french fries. However, rather than resulting in the normal soy vegetable oil flavor, a pleasant buttery taste in the french fries was present. The treated sample may also be sprayed on prebaked products such as potato products and baked dough products to provide a shortening coated or misted product having a natural meaty shortening flavor.

EXAMPLE 2

6000 grams of a soy oil blend were placed into a stainless steel 8-liter beaker. The top was covered by 2 layers of plastic film followed by 2 layers of heavy duty aluminum foil. Raw lard was similarly placed in another vessel, with a nitrogen purge utilized similar to that shown in FIG. 1.

Lard flavored gas from the lard-containing vessel directed into the vessel containing the soy blend for 2 hours with each vessel maintaining agitation for dispersion of gas. The temperature of the raw lard was 200° F. The temperature of the soy blend was 180° F. At the end of the 2 hour gassing period, the soy blend had a lardy/intense flavor. The product may be sprayed or misted onto prebaked products having a low shortening content or substantially all vegetable oil shortening content, without further cooking to provide a food product having a natural meaty shortening flavor.

While the present invention has been particularly described with respect to certain specific embodiments, it will be appreciated that various modifications and adaptations will become apparent from the present disclosure and are intended to be included within the scope of the following claims.

What is claimed is:

1. A method for treating vegetable oil fatty ester shortening composition to provide a natural meaty flavor comprising the steps of
   providing a natural meat fat,
   heating the meat fat to a temperature of at least about 150° F.,
   conducting an inert gas through the natural meat fat while maintaining the natural meat fat at a natural meaty flavor volatilization temperature of at least about 150° F. to provide an inert gas flavorant stream containing natural volatile meaty flavor components,
   providing a vegetable oil fatty ester shortening composition at a temperature less than said natural meaty flavor volatization temperature.,
   conducting said inert gas flavorant stream through said vegetable oil fatty ester shortening composition while maintaining said vegetable oil fatty ester shortening composition at a temperature less than said volatilization temperature of said meat fat to deposit natural meaty flavorant components in said vegetable oil fatty ester shortening composition to provide a vegetable oil fatty ester shortening composition which has a natural meaty flavor.

2. A method in accordance with claim 1 wherein said volatilization temperature is in the range of from about 175° F. to about 450° F.

3. A method in accordance with claim 1 wherein said volatilization temperature is in the range of from about 175° F. to about 220° F. and wherein said vegetable oil fatty ester shortening composition is maintained at a temperature in the range of from about 50° F. to about 120° F. while conducting said inert gas flavorant stream through said shortening composition.

4. A method in accordance with claim 1 wherein the weight ratio of said meat fat to said vegetable oil shortening composition is in the range of from about 1:4 to about 4:1.

5. A method in accordance with claim 1 wherein said method is a batch process, wherein said inert gas is conducted through said meat fat and wherein said inert gas flavorant stream is conducted through said vegetable oil shortening composition for at least about two hours.

6. A method in accordance with claim 1 wherein said method is a countercurrent continuous process.

7. A method in accordance with claim 1 wherein said inert gas is nitrogen and wherein said vegetable oil fatty ester shortening composition is a soybean oil having an Iodine Value in the range of from about 90 to about 110.

8. A natural meaty flavored vegetable oil composition prepared in accordance with the method of claim 1.

* * * * *

UNITED STATES PATENT AND TRADEMARK OFFICE
CERTIFICATE OF CORRECTION

PATENT NO. : 4,865,868

DATED : September 12, 1989

INVENTOR(S) : George E. Kuss.

Page 1 of 2

It is certified that error appears in the above-identified patent and that said Letters Patent is hereby corrected as shown below:

Face of Patent, References, under "Klein et al.", change date from "12/74" to --12/64--.

Column 2, line 29, change "b" to --by--.

Column 5, line 44, change "sparking" to --sparging--.

Column 6, line 34, change "sparking" to --sparging--.

Column 7, line 16, change "super-atmospheric" to

--superatmospheric--.

Column 9, line 23, after "soybean" delete ",".

claim 1, column 10, line 25, delete ".".

UNITED STATES PATENT AND TRADEMARK OFFICE
CERTIFICATE OF CORRECTION

PATENT NO. : 4,865,868

DATED : September 12, 1989

INVENTOR(S) : George E. Kuss

Page 2 of 2

It is certified that error appears in the above-identified patent and that said Letters Patent is hereby corrected as shown below:

Column 10, line 25, delete ".".

Column 10, line 47, change "said" to --the--.

Signed and Sealed this

Eleventh Day of September, 1990

*Attest:*

HARRY F. MANBECK, JR.

*Attesting Officer*  *Commissioner of Patents and Trademarks*